Dec. 31, 1963

W. J. EKEY 3,116,432

SUBMERSIBLE MOTOR CONSTRUCTION

Filed May 25, 1961

INVENTOR.
WILLIAM J. EKEY
BY
Toulmin & Toulmin
ATTORNEYS

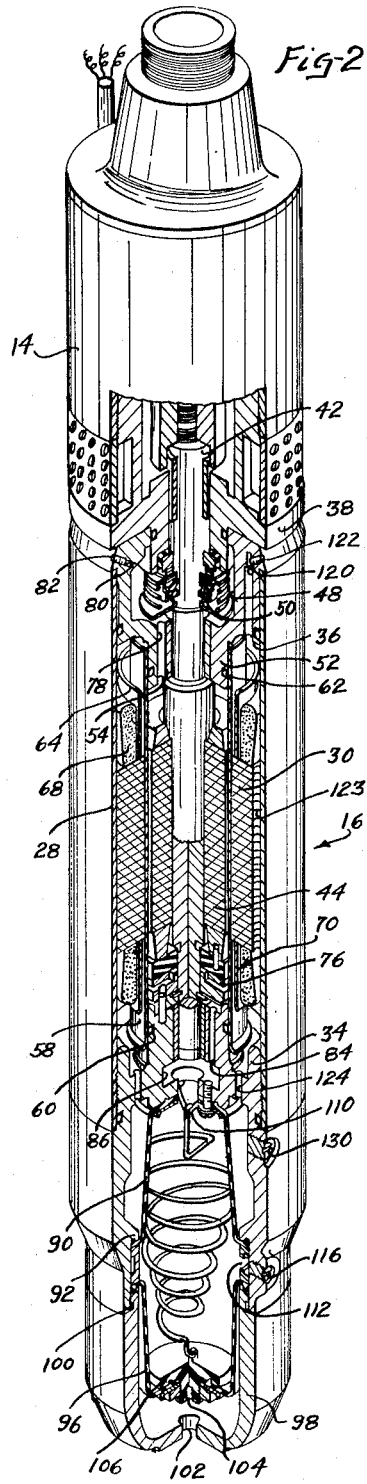

United States Patent Office 3,116,432
Patented Dec. 31, 1963

3,116,432
SUBMERSIBLE MOTOR CONSTRUCTION
William J. Ekey, Ashland, Ohio, assignor to The F. E. Myers & Bro. Co., Ashland, Ohio, a corporation of Ohio
Filed May 25, 1961, Ser. No. 112,569
11 Claims. (Cl. 310—87)

This invention relates to electric motors and is particularly concerned with electric motors constructed and arranged for operation while submerged in water as, for example, in connection with the driving of a pump.

In connection with submersible motors of the nature of which the present invention is concerned, a problem has always existed in connection with so devising the motors that they would have a long trouble-free service life, even though submerged in the water of a well and sometimes, for this reason, being under considerable external pressure. What has occurred is that water and fine sand have leaked into the motors ruining the bearings and sometimes causing electrical failure of the motor, and in general, creating great difficulties in connection with maintaining the motor in trouble-free service for a long time.

It has been proposed with some attendant success to fill the motors with a lubricant and to create on the lubricant a pressure which will act counter to the pressure of the water on the outside of the motor and thereby at one time to lubricate the motor while simultaneously preventing the ingress of well water into the motor.

The present invention is particularly concerned with an improvement in oil filled submersible electric motors.

A primary object of the present invention is to provide a relatively simple arrangement for maintaining the interior of a submersible electric motor entirely sealed and entirely filled with oil at all times.

Another object is the provision of a submersible electric motor which is filled with oil in which are are provided separate stator and rotor chambers, which are separately filled with oil, but in which the oil pressures are equalized at all times.

A still further object of this invention is the provision of a relatively simple arrangement for maintaining the interior of a submersible motor entirely filled with oil at all times while providing a substantial reservoir of the oil so that even in the event of some leakage of oil from the inside of the motor it can remain in service for a long period of time without any harmful results.

Still another object of this invention is the provision of an oil filled submersible motor in which the oil is maintained, at least at the point of possible leakage of water into the motor, at a pressure slightly above that of the water thereby preventing any water from entering the motor.

These and other objects of the present invention will become more apparent upon reference to the following specification taken in connection with the accompanying drawings in which:

FIGURE 2 is a perspective view partly broken away showing the lower end of the pump and the drive motor according to this invention that is connected to the pump;

FIGURE 4 is a fragmentary view showing the lower end of a submersible motor with a modified arrangement for the oil reservoir.

Figure 1:
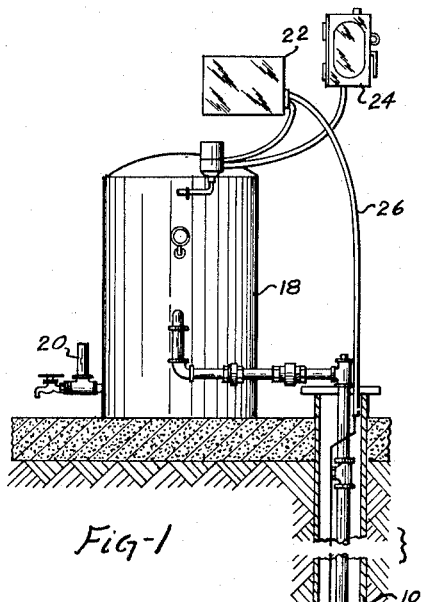
FIGURE 1 is a more or less general view showing a submersible pump and motor installation in which the motor is constructed according to this invention.

Referring to the drawings somewhat more in detail, in the well installation of FIGURE 1 there is a well casing 10 extending into the ground into a water bearing stratum and within the well casing, suspended on the drop pipe 12, is a pump 14, a multi-stage centrifugal pump, for example, and carried at the lower end of pump 14 is a submersible motor 16 according to this invention.

The drop pipe 12 leads to a pressure tank 18 to which is connected service line 20 and to which is also connected a control unit 22 which controls the supply of electric power from a fuse box 24 to an electric cable 26 leading downwardly along the drop pipe to the motor 16.

Figure 3:
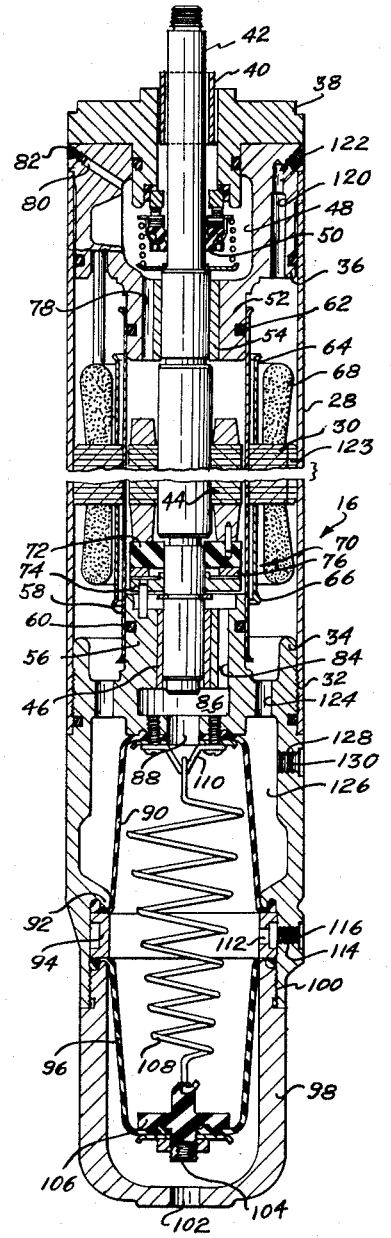
FIGURE 3 is a vertical sectional view through the motor drawn at somewhat enlarged scale showing more in detail the construction thereof.

The construction of the motor 16 will be more clearly apparent upon reference to FIGURES 2 and 3, wherein it will be seen that the motor comprises an outer cylindrical casing part 28 into which the motor field structure 30 is pressed. The lower end of casing 28 is threaded as at 32 to a lower closure member 34. At its upper end casing 28 receives the upper closure member 36 and is attached thereto in any suitable manner. The upper member 36 may further have attached thereto a top cap 38 that includes a bearing 40 for the upper end of rotor shaft 42.

Rotor shaft 42 extends downwardly on the axis of casing 28 and has thereon, in the proper position relative to the field 30 of the electric motor, the motor rotor 44. The lower end of rotor shaft 42 is journaled in a bearing 46 carried by lower closure member 34.

Upper closure member 36 is formed with a recess 48 in which is located a conventional rotary fluid seal 50 which effectively seals against leakage of fluid either into or out of the recess 48 through top cap 38.

According to the present invention, closure member 36 has a dependent cylindrical portion 52 in which is located a bearing 54 for the rotor shaft 42. Similarly, the lower closure member 34 has an upstanding cylindrical portion 56. These cylindrical portions are availed of for receiving a thin elongated sleeve member 58 and which is sealed to the cylindrical portions by the rubber-like O-rings 60 and 62. This thin sleeve extends along the inner periphery of the iron portion of the field 30. In this manner the entire field structure is isolated from the space in which rotor 44 operates. This sleeve may be formed, for example, of brass and can be quite thin because, according to the present invention, the oil pressures on the opposite sides thereof will remain substantially equal and the sleeve is thus not subjected to deforming pressures.

Shorter sleeves 64 and 66 may be provided at opposite ends of the stator interposed between the windings 68 of the stator and the first mentioned sleeve 58.

Figure 5:
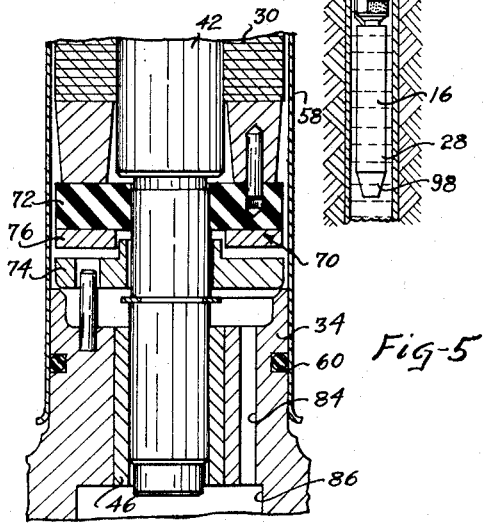
FIGURE 5 is a fragmentary view drawn at somewhat enlarged scale showing a thrust bearing that supports the rotor of the electric motor.

At the lower end of the rotor 44 there is provided a thrust bearing arrangement 70 which, as will be seen in FIGURE 5, comprises a member 72 pinned to the rotor, a member 74 pinned to lower closure member 34, and a bearing shoe 76 floating therebetween.

The interior of the motor, it will be noted, is completely divided into two separate compartments. One of these compartments is the rotory compartment which communicates by a passage 78 at its upper end with recess 48. Leading from recess 48 to the outside of the motor is a vent passage 80 adapted for being closed by pipe plug 82. At the lower end of the rotor chamber, communication is had about and through thrust bearing 70 with a passage 84 leading into lower closure member 34 to a cavity 86 at the lower end of bearing 46, and which cavity communicates through port 88 with the interior of a flexible rubber-like sleeve 90.

The upper end of sleeve 90 is sealingly clamped to closure member 34 about port 88 while its lower end is sealingly clamped to a ledge 92 of the closure member by a ring 94. Ring 94 at its lower edge clamps the periphery of a second flexible rubber-like bag 96 against the upper end of a cup-like member 98 that is threaded at 100 to the lower end of lower closure member 34. Cup-like member 98 has a port 102 in the lower most end through which well water can enter and also through which a tool can be threaded into the threaded recess 104 formed in a spring retainer element 106 sealingly clamped in the bottom of flexible bag 96.

Extending from the spring retainer element 106 upwardly inside the flexible bags is a tension spring 108 which has its upper end hooked to a wire bail 110 supported at the upper end of the first mentioned flexible bag 90.

Annular member 94 is provided with passage means 112 adapted for communication with a port 114 in lower closure member 34, which port is adapted for being closed by a plug 116.

Turning now to the other compartment within the motor, this is the compartment in which the stator or motor field structure 30 is located. At its upper end the stator compartment communicates with a vent passage 120 leading to the atmosphere and normally closed by a plug 122. Although the stator is pressed into casing 28, the upper and lower ends of the stator chamber are in fluid communication by means of one or more axial slots 123 extending along the stator iron. At its lower end, the stator chamber communicates via passage 124 with space 126 surrounding the first mentioned and upper flexible bag 90. Chamber 126 has a port 128 therein adapted for being closed by a plug 130.

After the motor has been assembled and prior to putting the motor in service, plugs 82 and 122 are removed from the vent passages for the rotor and stator chambers, and the ports 128 and 114 are then availed of for filling the chambers with oil. By engaging the spring retainer member with a tool and extending spring 108, an arrangement is provided whereby the oil supply in the motor can be under a slight pressure. When the chambers are completely filled and all of the air has been expelled therefrom, plugs 82 and 122 are replaced in the vent passages and plugs 130 and 116 are placed in the filling points, and then the tool is detached from the spring retainer element so as to release the spring and to apply the aforementioned slight pressure to the oil.

It will now be evident that, on account of the flexible bag 90 which is interposed between the bodies of oil in the two chambers, the pressures in the two chambers will be substantially identical at all times thereby preventing any transfer of oil therebetween and maintaining the opposite surfaces of sleeve 58 under substantially the same pressure so that the sleeve does not deform.

The spring 108 will maintain at least a slight pressure on the oil so that if any leaks do occur in the pump, it will be oil that will leak out instead of water leaking in.

It will also be apparent that a large quantity of oil is retained within the motor and that the largest quantity, namely the quantity within the flexible bags, is connected to the rotor chamber, which is the only chamber from which any oil is likely to leak because this is the only chamber that is in communication with a rotary seal. Thus, considerable leakage of oil from the motor could actually occur and, on account of spring 108, and on account of the water pressure standing on the outside of bag 96, the two compartments of the motor would remain filled with oil under the same pressure and a long trouble-free service life of the motor would thereby be assured.

In the modification of FIGURE 4, a substantially identical structure is illustrated except that there is no spring connected for biasing the lower bag 140 toward the upper bag 142. Instead, the water pressure within the well being exerted through port 144 and to the outside of bag 140 is depended on for maintaining a slight pressure on the oil, which is an overpressure as the pressure is measured further upwardly thorugh the motor. At the top of the motor, which is the only place that leakage is likely to occur, there will be sufficient overpressure of the oil over the water on account of the lower specific gravity of the oil to prevent any water from entering the motor.

In the case of either of the modifications described, it will be evident that an electric motor is provided, the interior of which is divided into two independent compartments entirely sealed from each other, and each entirely filled with oil with there being a flexible wall sealingly separating the compartments, but equalizing the pressure therein. Still further, the one compartment is absolutely sealed so that no leakage can take place therefrom, and in this compartment is located the higher voltage electric components of the motor.

The other compartment contains the lower voltage electric components, namely, the rotor, and this compartment has associated therewith a large body of oil under at least a slight overpressure with respect to the pressure of the water in the well, and this is provided because this is the only compartment from which a leakage normally can take place so that the large supply of oil insures that in the unusual event of any leakage, the rotor compartment will always remain filled with oil.

It is to be noted that the expansion of oil in either or both of the chambers is automatically taken care of by the expansible elements at the lower end of the motor. The expansion pressure of the oil in the stator chamber is applied against the exterior of the flexible member 90, and the expansion pressure of the oil in the rotor chamber is asserted against the interior of both the upper and lower expansible members. The pressures in the two chambers, however, at all times remain equal, and the two bodies of oil in the two chambers are always maintained separated from each other.

It will be understood that this invention is susceptible to modification in order to adapt it to different usages and conditions; and, accordingly, it is desired to comprehend such modifications within this invention as may fall within the scope of the appended claims.

I claim:

1. In a submersible motor; a motor casing comprising an outer sleeve and end members at opposite ends of the sleeves sealed thereto, a motor stator in said sleeve, a motor rotor associated with said stator having supporting shaft means journaled in said members, a thin sleeve extending through the inside of the stator and around the rotor and from one of said end members to the other defining inside of the casing separate rotor and stator chambers, radially spaced passages in the lower one of said end members communicating with said rotor and stator chambers respectively, a flexible member sealingly connected to the lower one of said end members between said radially spaced passages, said flexible member also being sealingly connected to the lower one of said end members adjacent the periphery of the said end member thereby sealing the stator chamber and hydraulically isolating the stator chamber from the rotor chamber while providing means for equalizing the pressures therebetween, and flexible reservoir means sealingly connected to the said lower one of said end members and communicating with the passage leading to said rotor chamber.

2. In a submersible motor; a motor casing comprising an outer sleeve and end members at opposite ends of the sleeves sealed thereto, a motor stator in said sleeve, a motor rotor associated with said stator having supporting shaft means journaled in said members, a thin sleeve extending through the inside of the stator and around the rotor and from one of said end members to the other defining inside of the casing separate rotor and stator chambers, radially spaced passages extending through the lower one of said end members communicating with said rotor and stator chambers respectively, a cylindrical portion dependent from said lower one of said end members, a flexible sleeve-like element within said dependent cylindrical portion sealed at its lower end to the periphery of said dependent portion and sealed at its upper end to the said lower end member between the said passages thereby hydraulically isolating the rotor chamber from the stator chamber while providing means for equalizing the pressures therebetween, and a flexible reservoir connected to the said lower one of said end members and communicating with the interior of said flexible sleeve-like member.

3. In a submersible motor; a motor casing comprising an outer sleeve and end members at opposite ends of the sleeves sealed thereto, a motor stator in said sleeve, a motor rotor associated with said stator having supporting shaft means journaled in said members, a thin sleeve extending through the inside of the stator and around the rotor and from one of said end members to the other defining inside of the casing separate rotor and stator chambers, said lower one of said end members having a dependent peripheral cylindrical portion, passages radially spaced in the upper end of said lower end member communicating with said rotor and stator chambers respectively, a flexible sleeve-like member sealed at its upper end to said lower end member between said passages and sealed at its lower end to the lower end of said cylindrical portion, and a flexible bag having its upper end sealed to the periphery of said cylindrical projection at the lower end thereby confining with said flexible member a reservoir of substantial size hydraulically connected to said rotor chamber, said flexible member providing means for equalizing pressures between said stator and rotor chambers.

4. In a submersible motor; a motor casing comprising an outer sleeve and end members at opposite ends of the sleeves sealed thereto, a motor stator in said sleeve, a motor rotor associated with said stator having supporting shaft means journaled in said members, a thin sleeve extending through the inside of the stator and around the rotor and from one of said end members to the other defining inside of the casing separate rotor and stator chambers, said lower one of said end members having a dependent peripheral cylindrical portion, passages radially spaced in the upper end of said lower end member communicating with said rotor and stator chambers respectively, a flexible sleeve-like member sealed at its upper end to said lower end member between said passages and sealed at its lower end to the lower end of said cylindrical portion, and a flexible bag having its upper end sealed to the periphery of said cylindrical projection at the lower end thereby confining with said flexible member a reservoir of substantial size hydraulically connected to said rotor chamber, said flexible member providing means for equalizing pressures between said stator and rotor chambers, there being spring means connected between the lower end of said flexible bag and the said lower one of said end members urging the flexible bag upwardly thereby to develop pressure on the oil in said rotor and stator chambers.

5. In a submersible motor; a motor casing comprising an outer sleeve and end members at opposite ends of the sleeves sealed thereto, a motor stator in said sleeve, a motor rotor associated with said stator having supporting shaft means journaled in said members, a thin sleeve extending through the inside of the stator and around the rotor and from one of said end members to the other defining inside of the casing separate rotor and stator chambers, said lower one of said end members having a dependent peripheral cylindrical portion, passages radially spaced in the upper end of said lower end member communicating with said rotor and stator chambers respectively, a flexible sleeve-like member sealed at its upper end to said lower end member between said passages and sealed at its lower end to the lower end of said cylindrical portion, and a flexible bag having its upper end sealed to the periphery of said cylindrical projection at the lower end thereby confining with said flexible member a reservoir of substantial size hydraulically connected to said rotor chamber, said flexible member providing means for equalizing pressures between said stator and rotor chambers, there being filling openings for supplying oil to the inside of said flexible member and into the said dependent cylindrical portion outside the flexible member, and means for venting the upper ends of said rotor and stator chambers.

6. In a submersible motor; a motor casing comprising an outer sleeve and end members at opposite ends of the sleeves sealed thereto, a motor stator in said sleeve, a motor rotor associated with said stator having supporting shaft means journaled in said members, a thin sleeve extending through the inside of the stator and around the rotor and from one of said end members to the other defining inside of the casing separate rotor and stator chambers, the said lower one of said end members comprising an upper transverse wall and a cylindrical portion dependent from the periphery thereof, a flexible sleeve having its upper end sealingly attached to the under side of said transverse wall and its lower end sealingly attached to said dependent cylindrical portion adjacent the lower end thereof, passages in said transverse wall connecting the interior of said flexible sleeve with one of said chambers and the exterior of said flexible sleeve with the other of said chambers, a cup-like member fixed to the lower end of said dependent cylindrical portion, a flexible bag in said cup-like member having its upper end sealed to the lower end of the said dependent cylindrical portion so as to confine with said flexible member a reservoir for oil, means for supplying oil to said reservoir, means for supplying oil to the space on the outside of said flexible sleeve, and means for venting the upper ends of said chambers.

7. In a submersible motor; a motor casing comprising an outer sleeve and end members at opposite ends of the sleeves sealed thereto, a motor stator in said sleeve, a motor rotor associated with said stator having supporting shaft means journaled in said members, a thin sleeve extending through the inside of the stator and around the rotor and from one of said end members to the other defining inside of the casing separate rotor and stator chambers, the said lower one of said end members comprising an upper transverse wall and a cylindrical portion dependent from the periphery thereof, a flexible sleeve having its upper end sealingly attached to the under side of said transverse wall and its lower end sealingly attached to said dependent cylindrical portion adjacent the lower end thereof, passages in said transverse wall connecting the interior of said flexible sleeve with one of said chambers and the exterior of said flexible sleeve with the other of said chambers, a cup-like member fixed to the lower end of said dependent cylindrical portion, a flexible bag in said cup-like member having its upper end sealed to the lower end of the said dependent cylindrical portion so as to confine with said flexible member a reservoir for oil, means for supplying oil to said reservoir, means for supplying oil to the space on the outside of said flexible sleeve, and means for venting the upper ends of said chambers, said cup-like member having an aperture so that the pressure surrounding the motor casing will also act on the exterior surface of said flexible bag.

8. In a submersible motor; a motor casing comprising an outer sleeve and end members at opposite ends of the sleeves sealed thereto, a motor stator in said sleeve, a motor rotor associated with said stator having supporting shaft means journaled in said members, a thin sleeve extending through the inside of the stator and around the rotor and from one of said end members to the other defining inside of the casing separate rotor and stator chambers, the said lower one of said end members comprising an upper transverse wall and a cylindrical portion dependent from the periphery thereof, a flexible sleeve having its upper end sealingly attached to the under side of said transverse wall and its lower end sealingly attached to said dependent cylindrical portion adjacent the lower end thereof, passages in said transverse wall connecting the interior of said flexible sleeve with one of said chambers and the exterior of said flexible sleeve with the other of said chambers, a cup-like member fixed to the lower end of said dependent cylindrical portion, a flexible bag in said cup-like member having its upper end sealed to the lower end of the said dependent cylindrical portion so as to confine with said flexible member a reservoir for oil, means for supplying oil to said reservoir, means for supplying oil to the space on the outside of said flexible sleeve, and means for venting the upper ends of said chambers, a spring connected between said transverse wall and the bottom of said bag urging the bag upwardly to pressurize oil therein, an aperture in the bottom of said cup-like member, and means on the flexible bag engageable through said aperture for expanding said spring while oil is supplied to the inside of the reservoir defined by said flexible sleeve and said bag.

9. In a submersible motor; a motor casing comprising an outer sleeve part and end members sealed to opposite ends thereof, a motor stator in said sleeve, a motor rotor within said stator, a supporting shaft for said rotor journaled in said end members, each said end member having a cylindrical portion extending therefrom toward said rotor, a thin sleeve fitted inside the stator and surrounding the rotor and sealingly engaging said cylindrical portions thereby defining within said casing separate rotor and stator chambers, said supporting shaft extending through one of said end members, and means connected to the other of said end members defining separate reservoirs connected to said rotor and stator chambers respectively, means including a first flexible wall element between said reservoirs providing means for equalizing the fluid pressures therein, and means including another flexible wall element for exerting pressure on one of said reservoirs, said first flexible wall element transmitting said pressure to the other of said reservoirs.

10. In a submersible motor; a motor casing comprising an outer sleeve part and end members sealed to opposite ends thereof, a motor stator in said sleeve, a supporting shaft for said motor rotor journaled in said end members, each said end member having a cylindrical portion extending therefrom toward said rotor, a thin sleeve fitted inside the stator and surrounding the rotor and sealingly engaging said cylindrical portions thereby defining within said casing separate rotor and stator chambers, said supporting shaft extending through one of said end members, and means connected to the other of said end members defining separate reservoirs connected to said rotor and stator chambers respectively, said means including a flexible wall element between said reservoirs providing means for equalizing the fluid pressures therein, said means also comprising means for exerting a continuous pressure on the oil in said chambers.

11. In a submersible motor; a motor casing comprising an outer sleeve part and end members sealed to opposite ends thereof, a motor stator in said sleeve, a motor rotor within said stator, a supporting shaft for said rotor journaled in said end members, each said end member having a cylindrical portion extending therefrom toward said rotor, a thin sleeve fitted inside the stator and surrounding the rotor and sealingly engaging said cylindrical portions thereby defining within said casing separate rotor and stator chambers, said supporting shaft extending through one of said end members, and means connected to the other of said end members defining separate reservoirs connected to said rotor and stator chambers respectively, said means including a flexible wall element between said reservoirs providing means for equalizing the fluid pressures therein, said means comprising spring means operable for exerting a pressure on at least the oil in the rotor chamber, said pressure being transmitted by said flexible wall means to the oil in said stator chamber.

References Cited in the file of this patent

UNITED STATES PATENTS

| 2,687,695 | Blom et al. | Aug. 31, 1954 |
| 2,790,916 | Hinman | Apr. 30, 1957 |